US005546107A

United States Patent [19]
Deretsky et al.

[11] Patent Number: 5,546,107
[45] Date of Patent: Aug. 13, 1996

[54] AUTOMATIC CHAIN-BASED CONFLATION OF DIGITAL MAPS

[75] Inventors: Zachary Y. Deretsky, San Jose; Uri Rodny, Palo Alto; Marvin S. White, Jr., San Carlos, all of Calif.

[73] Assignee: Etak, Inc., Menlo Park, Calif.

[21] Appl. No.: 222,965

[22] Filed: Apr. 5, 1994

[51] Int. Cl.$^6$ .................................................. G06F 17/30
[52] U.S. Cl. .................... 395/600; 340/995; 364/420; 364/974; 364/922.8; 364/223.8; 364/222.82; 364/DIG. 1; 364/DIG. 2
[58] Field of Search ..................... 395/600; 340/995; 364/420

[56] References Cited

U.S. PATENT DOCUMENTS

| 4,891,761 | 1/1990 | Gray et al. | 364/452 |
| 5,150,295 | 9/1992 | Mattingly | 364/420 |

OTHER PUBLICATIONS

Alan John Saalfeld, *Conflation: Automated Map Compilation;* Ph.D. Dissertation, University of Maryland, (College Park, Maryland, 1993), pp. 1–133.
*Conflation: The Merging Of Cartographic And Attribute Data—A Case Report,* by Eric Swanson and Virginia Peterman, publication unknown, publication date unknown, 10 pages.
Conflation Of Digital Maps; Z. Deretsky, U. Rodny, M. White, IVHS America 3rd Annual Meeting, Washington, D.C., Apr. 14–17, 1993.
Automatic Conflation of Digital Maps: How to Handle Unmatched Data, Z. Deretsky and U Rodny, IEEE–IEE Vehicle Navigation & Information Systems Conference, Ottawa—VNIS '93, pp. A27–A29.
Piecewise Linear Rubber–Sheet Map Transformation, Marvin S. White, Jr. and Patricia Griffin, The American Cartographer, vol. 12, No. 2, 1985, pp. 123–131.
Conflation—Automated map compilation; Alan Saalfeld, Int. J. Geographical Information Systems, 1988, vol. 2, No. 3, pp. 217–228.

*Primary Examiner*—Thomas G. Black
*Assistant Examiner*—Paul R. Lintz
*Attorney, Agent, or Firm*—Fliesler, Dubb, Meyer & Lovejoy

[57] ABSTRACT

The method of the present invention which employs conflation is based on pairing chains of arcs in order to determine the matching intersections between them. The chains are formed a priori in each map by using both attributes and geometric properties of the arcs. The intersections of chains are treated as relations, stored in a simple external custom relational database. The matching procedure is a set of the standard operations on RDBMS, as well as the sieving out of all possible ambiguous identifications. As a result, both maps become partitioned by the chains into much smaller pairwise matched areas called wards. The positional and semantic information from the matched chains is mapped onto the merged map. The mapping is performed by a general nonlinear transformation function. The transformation is then extended to the mapping of the unmatched content of wards onto the ultimate map. Any combination of geometry and attribute can be selected from either of a pair of matched wards for inclusion in the merged ward.

40 Claims, 13 Drawing Sheets

A1 AND A2 INTERSECT WHILE B1 AND B2 DO NOT.

AUTOMATIC CHAIN-BASED CONFLATION OF DIGITAL MAPS

BACKGROUND OF THE INVENTION

1. Field of the Invention

The present invention relates to the making of a digital map database in general and in particular to a consolidation method called "conflation" which requires the identification of matching features on two digital maps—vertices, arcs, and areas—for combining geometric and attribute data from the two digital map sources into one ultimate map.

2. Description of the Related Art

Quality digital maps are vital in many applications. They must provide sufficient positional accuracy as well as a whole variety of application attributes: city/street/road names, driving restrictions, addresses, company and business location, hotels, restaurants, etc. Customers may require additional features and attributes for their specific purposes, but there is no universal single source of all the data.

Source data for maps comes from federal, state and local governments and private businesses. Many exist in a variety of digital formats and differ a great deal in kind, quantity, and accuracy of the data attached. Different maps usually have a certain common core of geographic features, yet they may represent quite different points of view on the same area. For example, one map might have a lot of detail with respect to the bodies of water located therein, e.g. their names, shape, hydrological profile, etc, but not have anything related to political and administrative subdivisions of the area. Another map may have all the lake and river names omitted, but contain important county, city and ZIP-code information. Another typical situation is where one of the available maps has very good positional accuracy but has few attributes attached, while another one provides plenty of attributes but has inferior geographical coordinate accuracy. Even if both maps are geographically identical (i.e., are represented by the same set of vertices, arcs, and areas) they may differ substantially in terms of the quality and quantity of attributes. However, people often need both attributes and accuracy on the same map. All this implies is that there is a necessity to obtain all the valuable information from several maps in order to produce the "ultimate" map that comprises the best from all of the maps.

To combine the information from two digital maps related to the same area requires a special procedure called conflation. To date, such work has been performed manually by superimposing both maps on a computer screen. An operator identifies the potentially corresponding elements and makes all necessary changes, e.g. adds and deletes arcs and vertices as well as assigns and removes the attributes. This is a tedious, time consuming and costly process. Automation of conflation is beneficial, especially when a series of updates takes place. This, of course, necessitates handling the positional and/or topological inadequacy between the maps and discrepancies between the attributes.

Conflation and compilation are both used to denote the creation of a map from various sources. Whereas compilation connotes an editorial assembly of pieces of data from various sources, conflation connotes a scholarly investigation to determine the common source for variants of a text or oral tradition and in terms of map making has as its goal a more accurate and complete representation of the earth's surface than is provided by any of the sources used. The result is a higher quality map since common errors are accordingly more rare.

Conflation requires the identification of matching features, vertices, arcs, and areas, on at least two source maps.

A conflation program needs to be able to identify "the same" features on both maps, but a naive attempt to match vertices by their coordinates immediately fails. One reason for this is that the distance between two objectively matchable points in both maps is, in many cases, greater than the length of a street block. There are also quite a few cases where names (which are generally a rather robust attribute) are absent or distorted, or represent the alternate names of the same street ("El Camino Real" and "Route 82" in the San Francisco Bay Area, for example). For such reasons, simple straightforward matching often fails.

Two general approaches to the matching problem have been explored. One is called a "constructive" or local approach and the other is called a global approach.

In the local approach, see, for example, A. Saalfeld, *Conflation Automated Map Compilation, Int. J. Geographical Information Systems*, 1988, Vol 2, No. 3, pp. 217–228, it is assumed that a first algorithm identifies relatively reliable subsets of matched vertices from both maps as a first step. A second algorithm then travels from previously matched points to their neighbors, and tries to establish a match at a new pair of vertices. Therefore, the points are identified as mutually matched by a connecting path that is also matched.

Among the hidden obstacles in this method is that starting from one point, there are multiple paths to another point, which requires the use of a sorting function to select the appropriate path and, as might be suspected, different paths yield different values. As a result, it is difficult to set up adequate criteria for inclusion of the new pair into the matched set.

The global approach also consists of two stages. A global set of all potentially matchable elements is created and stored in a relational database. Then a number of filters are used to remove all false or dubious matches. The advantage of the global method is that very simple criteria can be used for eliminating the false or doubtful potential matches. For example, in the United States it has been found that street and road names provide an adequate tool for such filtering. However, a principal disadvantage of the global method is that it requires the creation and maintenance of a run-time database whose size may be comparable to the size of the original maps.

SUMMARY OF THE INVENTION

In contrast to the above-described prior major efforts to localize geometrically or topologically identical vertices and then extend the matching by connectivity, the method of the present invention which employs conflation is based on pairing chains of arcs in order to determine the matching intersections between them. The chains are formed a priori in each map by using both attributes and geometric properties of the arcs. The intersections of chains are treated as relations, stored in a simple external custom relational database. The matching procedure is a set of the standard operations on RDBMS, as well as the sieving out of all possible ambiguous identifications. As a result, both maps become partitioned by the chains into much smaller pairwise matched areas called wards. The positional and semantic information from the matched chains is mapped onto the merged map. The mapping is performed by a general non-linear transformation function. The transformation is then extended to the mapping of the unmatched contents of wards onto the ultimate map. Any combination of geometry and attributes can be selected from either of a pair of matched wards for inclusion in the merged ward.

At first all arcs with the same name are combined in chains. A chain is a sequence of oriented arcs without self-intersections or reversal of direction. In other words, if two adjacent arcs bear the same name they are linked together. No forks or branches are allowed. If three or more arcs with the same name meet at a vertex, then three separate chains would be generated. Simple loops are legal. The chains information is stored in a record with chain ID, street name, locations of the beginning and end of the chain, etc. This record allows one to identify and traverse the chain in both directions in the map.

As a separate step, names are specially processed in order to identify virtually identical names represented by different character strings, and to exclude obvious mistakes. Next, all names are sorted lexicographically and groups of chains with identical names are formed. In each case, the formation of the chains and the importation of attributes from the source maps to the ultimate map according to the present invention is fully automatic.

BRIEF DESCRIPTION OF THE DRAWINGS

The above and other objects, features and advantages of the present invention will become apparent from the following detailed description of the accompanying drawings, in which.

DESCRIPTION OF THE PREFERRED EMBODIMENTS

Figure 1:
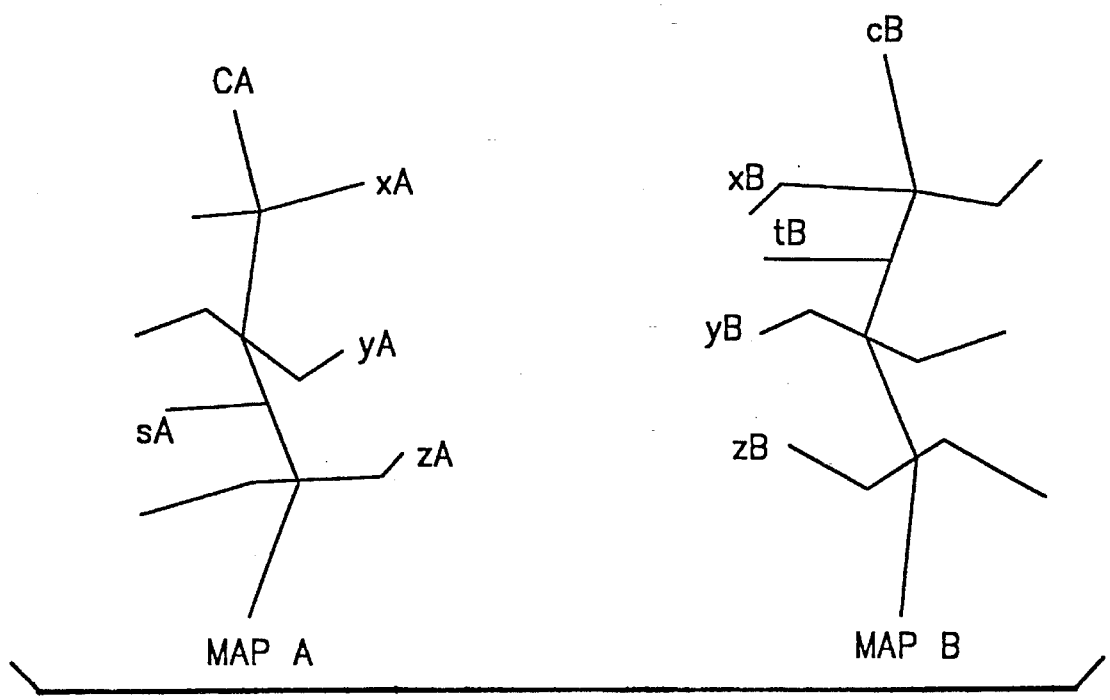
FIG. 1 is an illustration of two maps A and B comprising chains cA and cB, according to the present invention.

Referring to FIG. 1, as will be described in more detail below, the conflation method of the present invention begins with two source maps A and B having A-groups of chains and B-groups of chains, respectively. Software matches or attempts to match the A-chains and B-chains between intersections with other A-chains and B-chains of the same name to generate a list of A and B chains, i.e., a pair of isomorphic factor-graphs.

As seen in FIG. 1, there are two chains: cA from Map A and cB from Map B. The intersection (cA,xA) matches the intersection (cB,xB) because chains cA and cB are in the same group, that is, they have the same names as chains. The (cA,yA) intersection matches (cB,yB) and (cA,zA) matches (cB,zB). However, by way of a verification procedure it is shown that the (cA,sA) intersection does not match the (cB,tB) intersection. There are at least two reasons for this: (1) sA and tB have different names (belong to different groups), and (2) their positions on the cA and cB chains are different with relation to the other intersections. Thus (cA, sA) is located between (cA,yA) and (cA,zA), while (cB,tB) is located between (cB,xB) and (cB,yB). The verification procedure follows the identification of pairs of potentially matching chains and removes, or at least identifies, false matches like (cA,sA), (cB,tB) if any exist.

From the foregoing the importance of identifying chains is apparent. They allow a reduction in the complexity of matching and the development of a simple set of filters. For example, the match between (cA,xA) and cB,xB) means that it must satisfy certain conditions on both chains cA and cB and on chains xA and xB. That is, verification procedures are used to determine whether or not the intersecting chains have the same vertices. The potential pairs of intersections which do not become the actual ones are easily detected and identified for further investigation and correction.

Figure 2:
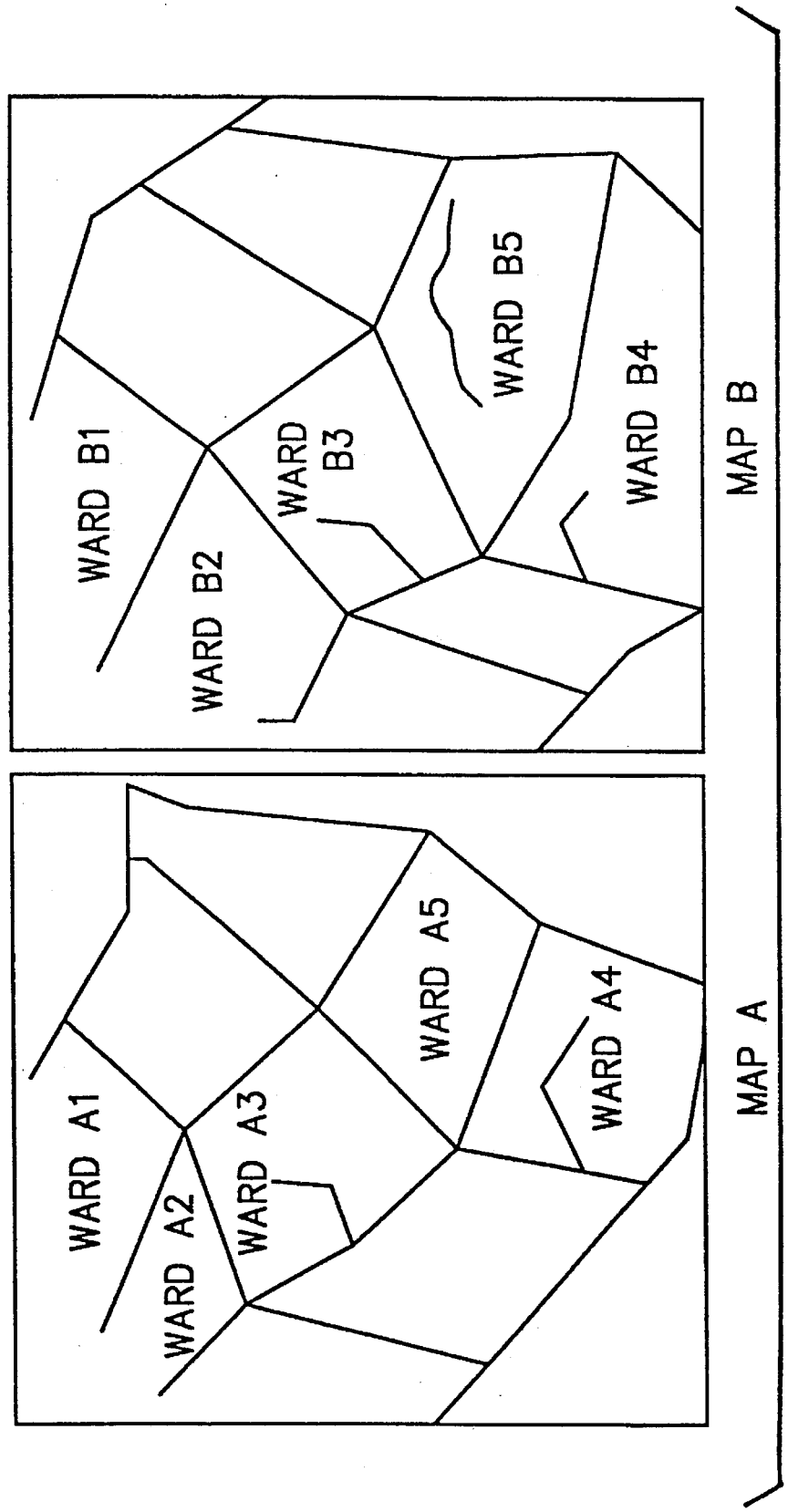
FIG. 2 is an illustration of maps A and B which have been reduced to a plurality of wards.

Referring to FIG. 2, as a result of the above described procedures, a number of matched vertices are obtained and stored in the isomorphic factor-graph database. The pieces of matched chains between the matched vertices break the whole map into a set of matched areas, or wards. A final verification checks the topological consistency of every matched pair of wards and removes some of the chains if necessary.

The final stage of the program is the transformation of the vertices and arcs of the maps A and B into a final map C and the assignment of the proper attributes thereto. Often one of the maps, e.g. Map A, has better positional accuracy, while the other map, e.g. Map B, might have more geographical data. For example, one could choose Ward 5 in Map A as a positional pattern and reproduce its layout in map C without changes. The importation of unmatched features, such as appears in ward B5, is discussed below. Next, an examination is made of every matched chain from Maps A and B and a decision is made as to which unmatched vertices in the matched chains should be put into Map C. Some A-born vertices may be removed, while other B-born ones may be inserted.

Then the attributes along these chains are considered. If B-born attributes are undoubtedly advantageous, the A-born attributes are replaced with them. In other cases, some attributes could be replaced, while others are not. The operator provides a configuration table defining the actions to be taken regarding the attributes. At this point all the matched vertices and chains have been mapped onto the Map C.

The inner part of a ward needs to be transformed to map C also. Primarily piecewise linear transformations have been used in rubber-sheeting as described by M. White and P. Griffin, in *Piecewise Linear Rubber-Sheet Map Transformation, The American Cartographer*, Vol. 12, No. 2, 1985, pp 123–131. For purposes of the present description, the transformation requires that both maps A and B be uniformly triangulated, which is not an easy task. The geographical data—arcs and vertices inside the ward—can be transmitted by means of a non-linear transformation function. This mapping is defined on the subsets of boundary points of the A- and B-wards. At each such point, there is a displacement vector pointed to the image of the point in the Map C. Given a point inside the B-ward, for example, one can calculate a weighted sum of the boundary displacements using distances between the given point and the boundary ones. In such a way, for example, the unmatched polyline in the ward B5 can be mapped to C. The mapping behaves remarkably well and produces very few self-intersections or intersections with other arcs. It is essential that the boundary for each ward maps exactly the matching boundary in Map C.

There are several strategies applicable to the remaining unmatched contents of a ward. First, the content of both a ward A and a ward B can be transformed independently into a corresponding C-ward in map C. In a manual follow up, if used, the redundant elements are removed and attributes are reassigned. A second option is to select the arcs from A and B to be transformed with further identification of potentially matching elements. Since the whole map is reduced to the size of a much smaller ward, the matching capabilities substantially increase by the fine tuning methods with greater emphasis on geometric matching. As a result, the original ward is subdivided into smaller ones. Then the procedure is repeated until no further subdivisions are produced.

Finally, the aerial attributes are assigned to those pieces which comprise the C-ward in map C and bounded by (partially) unmatched arcs such as shown in Ward 4 of FIG. 2.

As described above, the algorithm of the present invention is based on the usage of chains of arcs in order to determine the matching intersections between them. The chains are formed by using both attribute and geometric properties of the arcs. As a result both maps become partitioned by the chains into much smaller pairwise matched areas called wards.

Thus, as will be further described below in even more detail, the ultimate map begins as a copy of one of the source maps. After the application of matching criteria to generate a pair of isomorphic factor-graphs, attribute information from the matched chains and wards is retrieved and transferred onto the ultimate map according to user configurable rules.

The remaining task is to bring over automatically into the ultimate map a maximum amount of the unmatched data from the second source without sacrificing the integrity of the result. For this purpose specific filters are used to prevent importing unmatched arc data having geometric and attribute properties that will interfere with each other or a previously imported matched arc. Areal features are also transferred.

At the outset it is to be understood that a digital map is a planar graph consisting of nodes, links and faces with topological relationships, e.g. boundary and co-boundary relationships, between them. As used above, nodes are also called vertices, links are called arcs and areas or regions are called faces. Still other terminology calls the same elements of the graph 0-cells, 1-cells and 2-cells, respectively. Thus, as used herein a 0-cell is the end point of a 1-cell. A 1-cell comprises a line of uniform characteristics, e.g. a block of a street, a length of shoreline, a county line, or the like. A 2-cell comprises an area or region of uniform characteristics, e.g. a park, a lake, a forest, or the like, enclosed within one or more chains of 1-cells. Any number of attributes can be attached to any element of the graph.

For purposes of describing the present invention in even more detail it will be assumed that there are two digital maps, A and B, available which cover the same area, but which originate from different sources and thus have different content. Without loss of generality, it can be assumed that map A possesses good positional accuracy, while map B has better coverage (more streets) and some attribute data which is missing in map A. For example, map B might have more address data for the streets present in map A in addition to the address data for the streets present only in map B. Map B might also have 2-cell attributes such as census blocks and tracts entirely absent in map A.

AS stated above, the objective is to identify parts of map A and map B which represent the same "ground truth" features and to automatically create a third digital map, C, which is consistent and combines line work, i.e. 1-cells, and attributes of both maps, it being understood that to combine all the information form both maps is often impossible. Indeed, because some of the information provided in one or both of the sources may be erroneous, a third reliable source or field work is often necessary for the areas where topology, geometry or attributes of maps A and B are grossly different. For example, double lane roads and freeway interchanges might have very different representation in both maps, so matching them automatically might be difficult, if not impossible.

In view of the foregoing, the object of the present invention is: 1) to match as many features in both maps as possible; 2) bring into map C those unmatched 1-cells from maps A and B which are topologically consistent and do not interfere with the existing data; 3) conflate attributes on matched cells; and 4) collect the unutilized conflicting data to determine whether additional sources and/or manual work is necessary. Ideally, the elimination of the need for any manual intervention is of paramount interest to the utilization of the present invention, but depends on factors beyond the operator's control such as, for example, the quality of the sources.

Overall, the method of conflation of the present invention comprises the following steps of attribute matching, chain creation, chain matching, consistency checking and ward creation which are briefly described as follows:

1. Attribute Matching

Attribute values from both maps A and B are matched and assigned group numbers. For example, "Lincoln Av." in map A will match "Lincoln avenue" in map B and both will be identified as belonging to the same group. This is done for all 1-cell attributes, the most significant of which is the street name attribute. However, other attributes could prove to be equally useful. For example, all railroads, all shorelines, etc. of both maps could be given the same group number.

2. Chain Creation

A chain is a sequence of 1-cells belonging to the same group. No forks are allowed, simple loops are acceptable. Chains are created for both maps A and B and then indexed. By walking along a given chain one can examine 0-cells, i.e. street intersections, and determine which chains associated with what groups cross a given chain.

3. Chain Matching

Chains from both maps A and B are sorted by group and then for every group the chains from map A are compared with the chains from map B. If two chains, one from map A and another from map B, are far apart geometrically, the match is rejected. In another test of chain matching, the sequence of intersections of the chain in map A is compared with those of a chain in map B in both directions along the chain. If unambiguously matched sub-sequences of intersections exist, 0-pairs and 1-pairs are created. A 0-pair is a pair of two matched 0-cells, one from map A and another from map B, and a 1-pair consists of two matched subchains between 0-pairs.

4. Consistency Checking

Matched subgraphs of map A and map B have to be topologically isomorphic, i.e. comprise a similar structure. Parts of the graphs which violate the isomorphism are detected and removed.

5. Ward Creation

Matched subgraphs break maps into areas which are called wards. Every ward consists of one or more original 2-cells. The boundaries of matched wards will define a transformation for the transfer of the unmatched 1-cells. An example is given below.

The resulting Map C begins as a copy of Map A and missing attributes are transferred from Map B to Map C for the matched 0- and 0-pairs. What must be decided is which unmatched 1-cells in map B should be brought over to Map C and which ones should be suppressed.

Referring to FIGS. 3–8 there is provided a series of maps illustrating the method of conflation of the present invention at various stages thereof.

Figure 3:
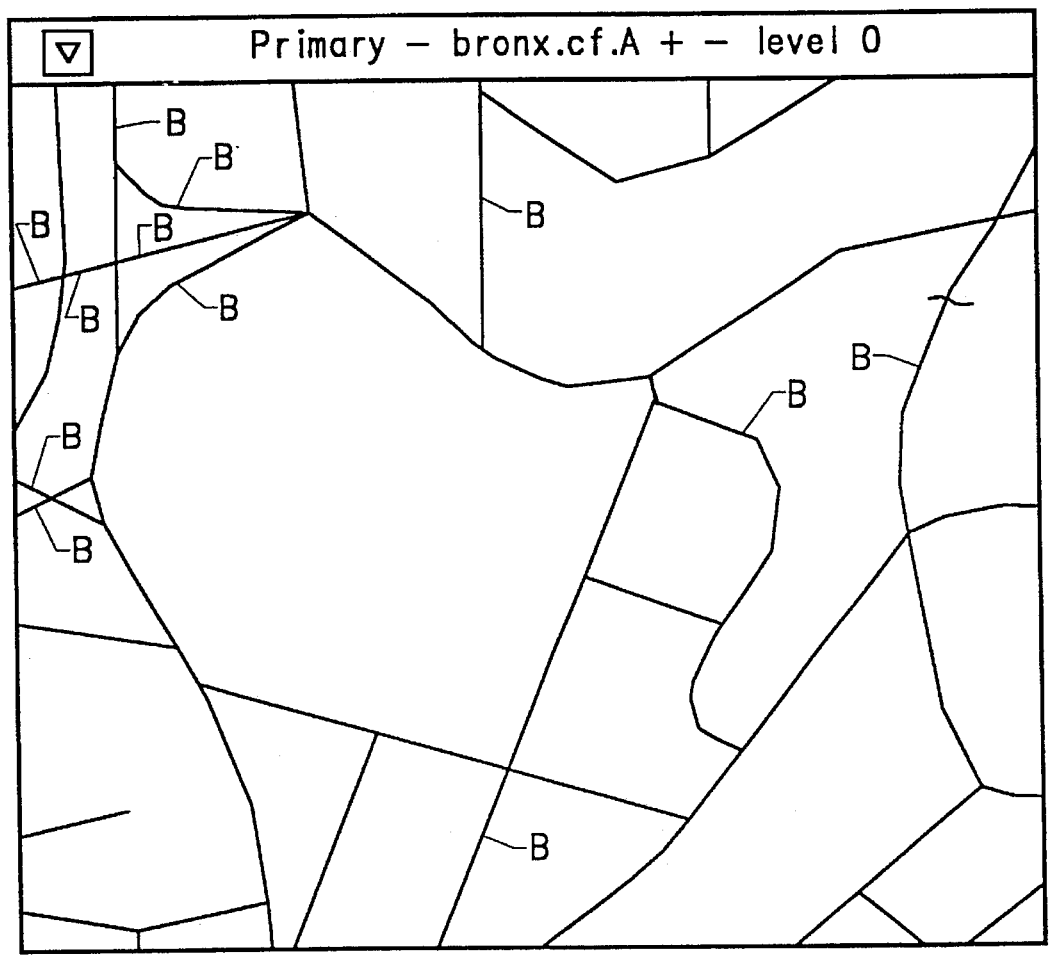
FIGS. 3 and 4, also called maps A and B, respectively, are illustrations of two versions of a selected area of a city which are drawn to an identical scale.
Figure 4:
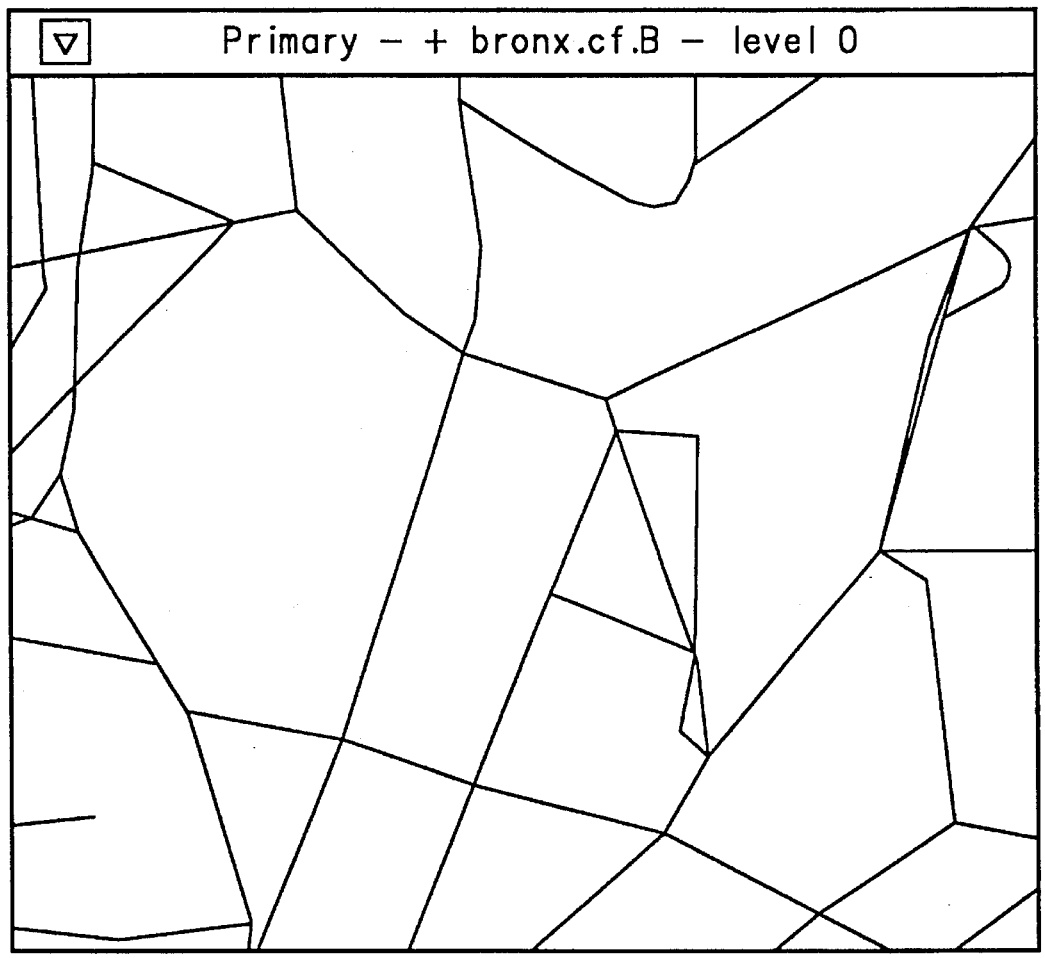
Figure 5:
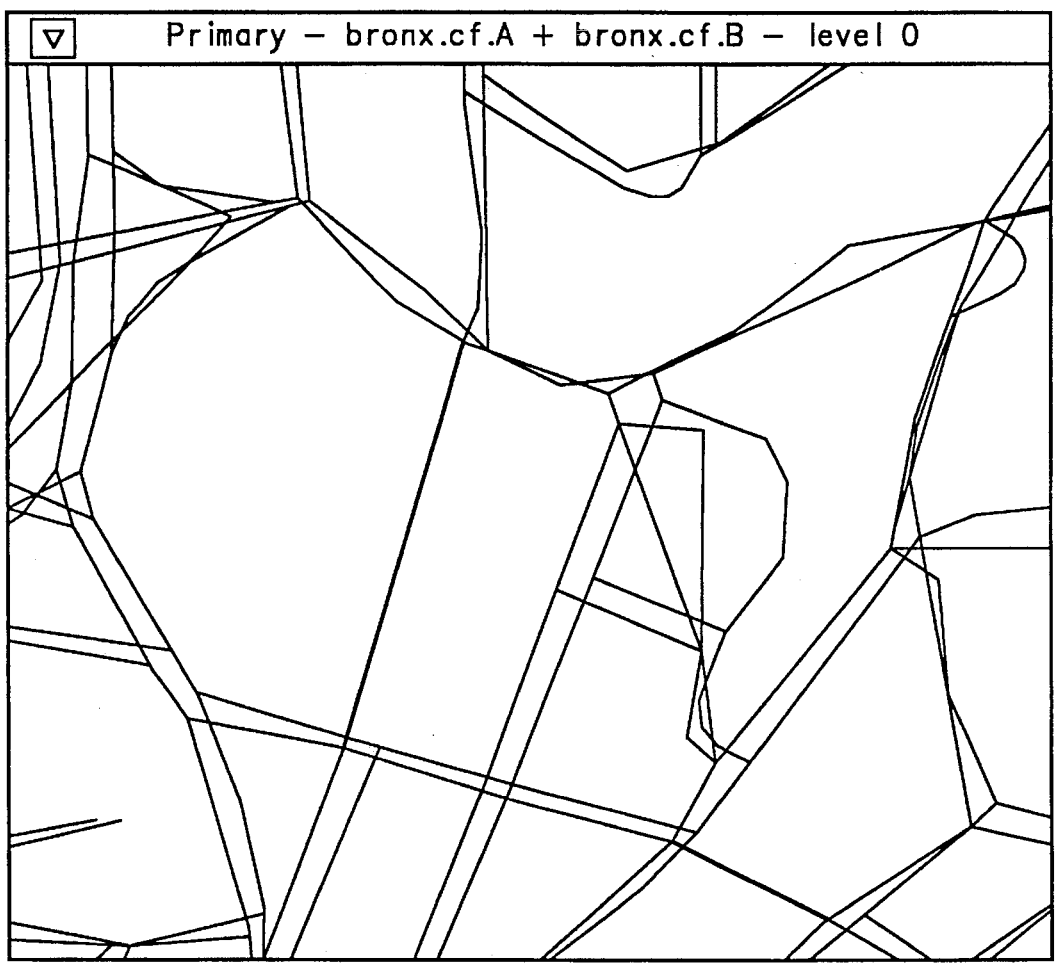
FIG. 5 is an illustration of maps A and B of FIGS. 3 and 4, albeit on a larger scale, which are superimposed.

For example, in FIGS. 3 and 4, also called maps A and B, respectively, there is illustrated two versions of a selected area of a city, which are drawn to an identical scale. In FIG. 5 maps A and B of FIGS. 3 and 4, albeit on a larger scale, are superimposed. With the maps A and B superimposed it can be seen that most, if not all, of the streets in map A (FIG. 3) are somewhat displaced from what would appear to be the corresponding streets in Map B (FIG. 4). For example, assuming North to be at the top of the figures, the streets of map A appear to be somewhat East and North of the corresponding streets in map B.

Figure 6:
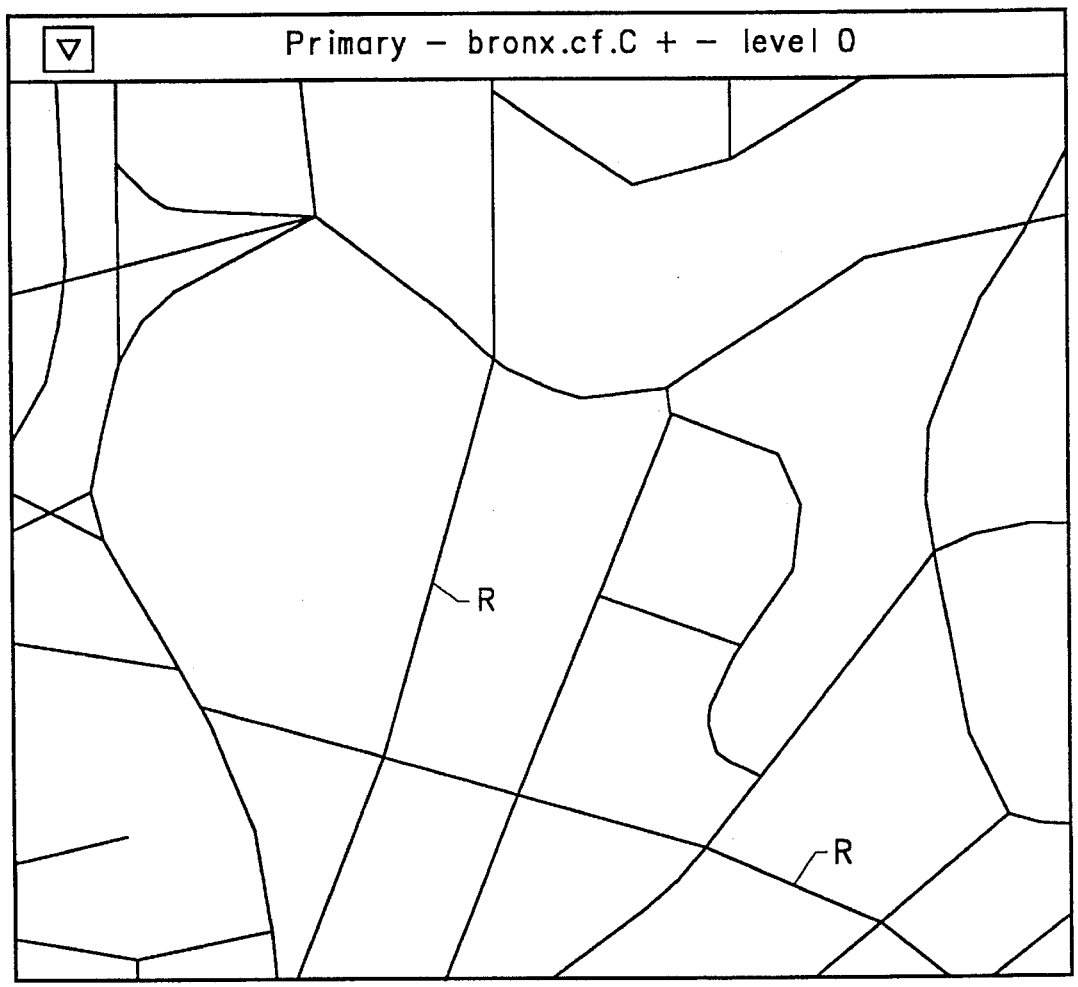
FIG. 6 is an illustration of a conflation of a pair of maps A and B which begins with choosing one of the maps as a base map from which the ultimate map, i.e. map C, is created.

Referring to FIG. 6, as indicated above, the conflation of a pair of maps A and B begins with choosing one of the maps as a base map from which the ultimate map, i.e. a map C, is created. For purposes of the description of the present invention, map A, (FIG. 3) is chosen to serve as the base map. Accordingly, and as can be seen from a comparison with map A, map C, as illustrated in FIG. 6, albeit at the same scale as FIG. 5, comprises all of the 0-cells, 1-cells and 2-cells of map A (FIG. 3).

In addition to the creation of map C, it should be understood that all of the 1-cells of maps A and B are subjected to a matching procedure, i.e. a filtering process comprising a plurality of filtering modules, to identify those 1-cells in map B which match 1-cells in map A. This process, as will be further described below, is called "Matching by Rejection" and results in the creation of a pair of isomorphic factor graphs in which the matched 1-cells of maps A and B are listed. For convenience, the 1-cells in map A for which no matching 1-cell could be found in map B using the filtering modules described below are designated with a "B."

Figure 7:
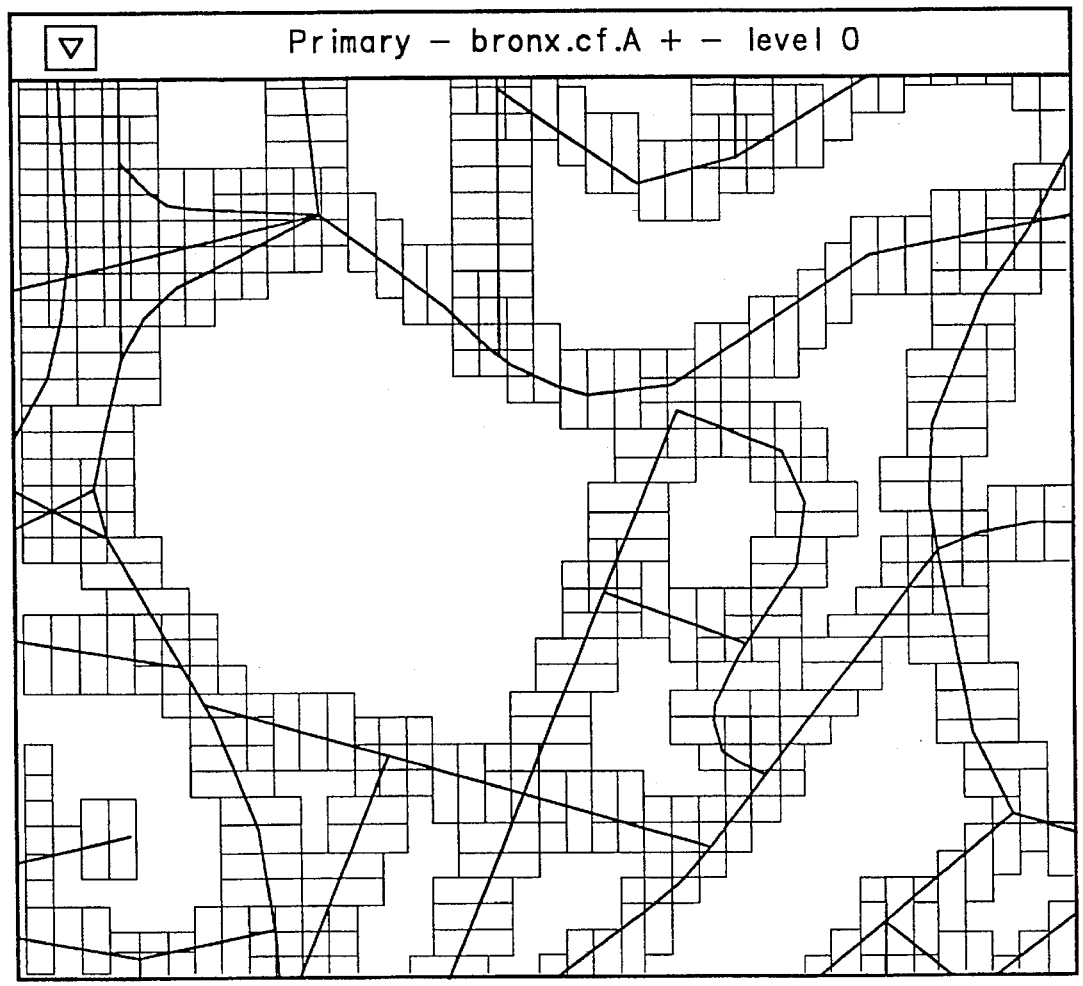
FIGS. 7 and 8 are replications of maps A and B of FIGS. 3 and 4 on which is superimposed a plurality of grid members according to the present invention.
Figure 8:
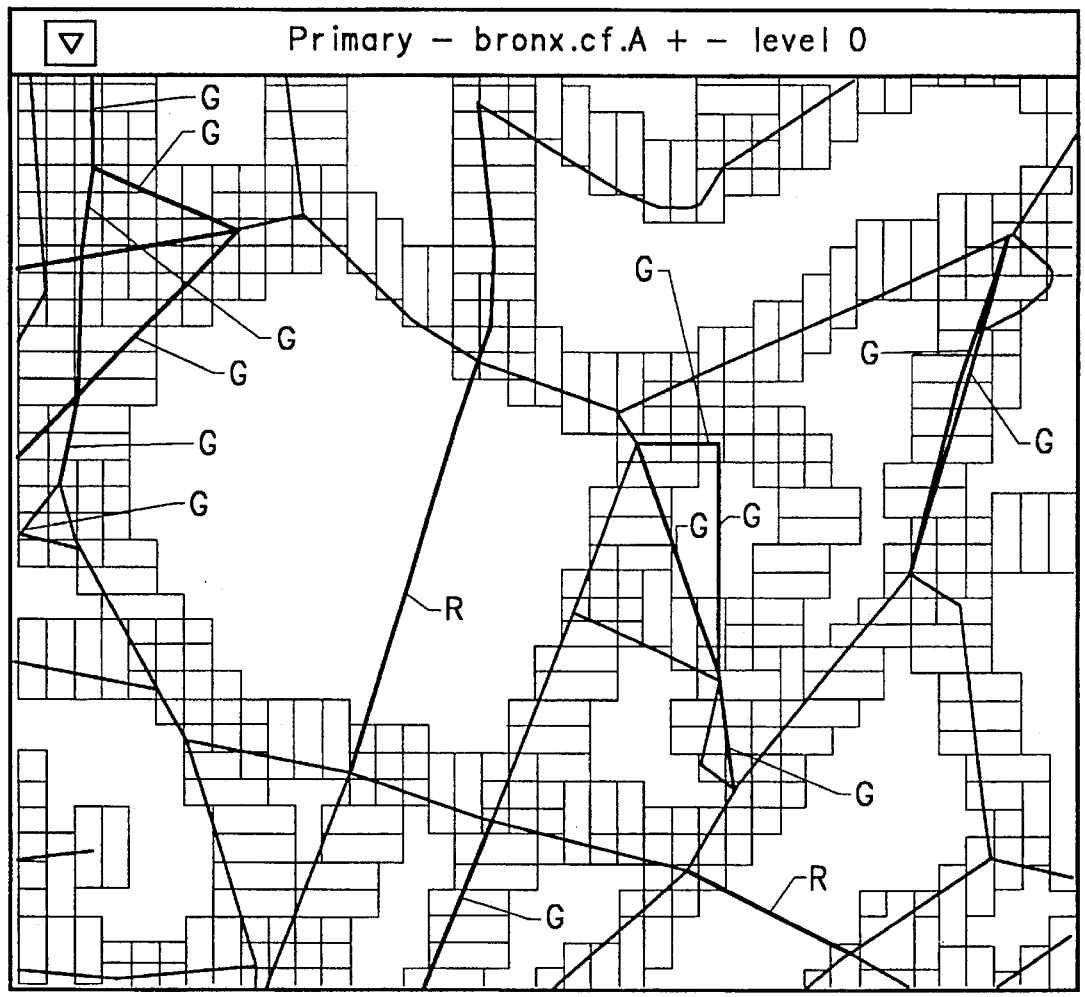

Referring to FIGS. 7 and 8, after identifying the 1-cells in map B which match 1-cells in map A, it is necessary to import into map C those unmatched 1-cells in map B which will not interfere with existing 1-cells in map C. As further described below, this is accomplished using another filtering process comprising a modified Bresenham algorithm for thick/wide lines.

As seen in FIG. 7, the 1-cells therein, which correspond to the 1-cells of map C (FIG. 6) and consequently also the 1-cells of map A (FIG. 3), have superimposed thereon a plurality of square boxes in groups of three which form rectangular boxes in a grid format about the 1-cells. Typically, the pixel size, i.e. size of each of the square boxes, is chosen as a function of existing geometric discrepancies between map A and map B, e.g. 100 feet square. The grid is represented in memory with 1 bit for every pixel and simulates a selected thickness or width of the 1-cells so that any line or other 1-cells which penetrate the grids by a predetermined amount will be considered to be interfering and therefore, not imported into map C.

Referring to FIG. 8, the grid of FIG. 7 is superimposed on a re-creation of map B (FIG. 4). Those unmatched 1-cells of map B which, if imported into map C, would penetrate the grids in map C to an unacceptable degree and therefore would interfere with the existing 1-cells of map C, are designated by the letter "G" and not imported into map C. By the same token those unmatched 1-cells of map B which, if imported into map C, would not penetrate the grids in map C to an unacceptable degree and therefore would not interfere with the existing 1-cells of map C, are designated by the letter "R" and are imported into map C. In general, if the only penetration of the grid in map C by a particular 1-cell from map B is by the ends of the 1-cell from map B, the penetration is not considered to represent an interfering situation and the 1-cell from map B is imported into map C. Two such 1-cells designated by "R" in FIG. 8 also appear in map C (FIG. 6).

The resulting Map C will be topologically consistent but not every 2-cell of Map B will have all of its boundary represented in Map C. Therefore direct transfer of 2-cell attributes such as zip codes, census tracts and blocks, water features and the like are not always possible. The task then is to determine what attribute values should be assigned to every 2-cell of Map C. For this purpose Map C is covered with a uniform grid of points. For a given 2-cell in Map C one finds in Map B the pre-images under the ward transformation at all the grid points covered by the 2-cell. Then the values of the attributes are measured at these pre-images and a vote taken for each attribute.

The above described method does not require manual operations while creating a consistent map which combines all of the data from one source and most of the missing data from the other. The data which was not transferred, relatively small in size, can still be utilized in a manual process, if so desired.

In at least one of its aspects, the method of the present invention may be characterized as "Matching by Rejection" in which a number of definitions may be set forth to facilitate a clear understanding of the invention as follows:

1.0 Map definition

As used herein the term map has the standard mathematical definition of a planar graph, in which vertices are called 0-cells, arcs are called 1-cells, and faces are called 2-cells. The boundary of a 2-cell is a set of properly oriented loops. The boundary of a 1-cell is an ordered pair of 0-cells which terminate the 1-cell. The term "ordered" refers to the fact that the 1-cell extends "FROM" one of the 0-cells "TO" the other 0-cell. The co-boundary of a 0-cell is an ordered list of 1-cells attached to the 0-cell. The term "ordered" refers to the fact that plural 1-cells are listed in a clockwise direction about the 0-cell, a 1-cell extending into the 1-cell is considered positive (+) and a 1-cell extending from the 1-cell is considered negative (−). In addition to the cells, the map can have data attached, called attributes. As discussed above, a 0-cell may be a landmark, e.g. school, a 1-cell may be a street and a 2-cell may be a park.

2.0 Topologically isomorphic graphs

Two graphs A and B are called isomorphic if there is a one-to-one correspondence between their cells preserving the connectivity relations as well as the order in the boundary/co-boundary lists. This is a standard mathematical definition. For example, if a 0-cell a0 from map A corresponds to a 0-cell b0 from map B, then for each 1-cell a1 attached to a0 there is a corresponding 1-cell b1 attached to b0 and the relative order of the corresponding 1-cells around a0 and b0 must be the same.

3.0 Chain definition

The following defines a chain:

a. A chain C is a connected set of 1-cells.

b. If a 0-cell c0 is an endpoint of a 1-cell from chain C then there can be a maximum of one more 1-cell from C attached to c0.

c. Two different chains with the same attribute may intersect only at their endpoints.

In other words, a chain is a simple polyline or simple loop without self-intersections and chain properties are virtually identical to the ones of a regular cell.

4. Factor-graph

A factor-graph is formed by matched chains. Pieces of chains serve as 1-cells. The 0-cells are the chain endpoints and the 2-cells are represented by the areas partitioned by chains.

5. Conflation matching

Conflation matching means the identification of maximal isomorphic factor-graphs on both maps, i.e. matching as many 1-cells as is possible.

The method of conflation according to the present invention comprises a plurality of modules which are described as follows:

6.1 Chain creation

The chain creation module looks at all 1-cells on both maps A and B separately. It loops through the list of all suitable attributes of each of the 1-cells, e.g. street names. Given a value, i.e. a character string, e.g. El Camino, the module tries to find another 1-cell with the same value connected to a first end, i.e. 0-cell, of the original 1-cell. If such a cell is found the chain is extended up to a point where there are no more identically attributed 1-cells or more than one 1-cell is found having the same attribute value, i.e. a fork in the road wherein roads diverging from the fork have the same attribute value, e.g. name. The same operation, i.e. extension of the chain, is applied to the other end of the first 1-cell. With the addition of each 1-cell to a chain the 1-cell is specifically labeled to prevent its being processed twice and a chain-record formed having the following format:

<attribute value><A/B map><first point, i.e. 0-cell, on the chain><last point, i.e. 0-cell, on the chain>

The record is then placed in a chain-file and given a unique chain-number.

6.2 Attribute grouping

In this step each record in the chain-file receives a group number. If two chains have different attribute values which nevertheless may be considered as identical, they receive the same group number. For example, FIRST STREET and 1ST ST can belong to the same group.

6.3 0-Cell listing

All 0-cells on the created chains are placed in two so-called Dot-files having the following format <cell identifier><group number><chain number><cell index>, where the <cell index> is a sequential index of a 0-cell in the chain. This is done by a Dot module, which assigns a sequence to 0-cells relative to chains, e.g., .a, .b, .c, etc.

6.4 Intersections listing

If a 0-cell in a Dot-file belongs to two different chains (an intersection) then a record of a grid file is formed having the following format <group1 group2><A/B><chain1 chain2> . . . <index1 index 2><cell id>

This is done by module Grid.

6.5 Potential matches

Each record in a Grid-file indicates and intersection. If there are two such records, one from Map A and one from Map B with the same pair of groups, they present a potential match. A Track-file is formed by combining pairs of records of Grid-files. Given two records in a Grid-file, the records would have the following format:

<group1 group2><A><chainA1 chainA2> . . . <indexA1 index A2><cell A>

<group1 group2><B><chainB1 chainB2> . . . <indexB1 index B2><cell B>

The two track-records corresponding to the same intersection are formed as follows:

<chainA1 chainB1><indexA1 index B1><cell A cell B>

<chainA2 chainB2><indexA2 index B2><cell A cell B>

The first record above corresponds to following chain A1 in map A and chain B1 in map B. The second record above corresponds to following the intersecting chains A2 and B2. In both cases, one arrives at the same 0-cells, i.e. cell A in map A and cell B in map B.

This is done by module Track. This module places the symbol "U" on those chains which belong to more than one group in order to prevent the formation of numerous false potential matches. The Track-file is then sorted lexicographically.

7.0 0-Cell and 1-cell filtration

First, an isomorphism between two subsets of 0-cells is built by several successive runs of different filtering procedures which reject certain potential matches if they are recognized as invalid. The filtering procedures or modules, which are called Limbo, Proxy, Fluff, Train, Ambi, Mono, Mar and Zombie, are defined as follows:

7.1 Limbo

This module recognizes and processes the multiple intersections of a chain from map A and a chain from map B. It tries to detect the mutual orientation of the potentially matchable chains, reject those potential 0-cell matches which do not agree with the orientation and place the symbol "L" on the rejected records of the Track-file.

Figure 9:
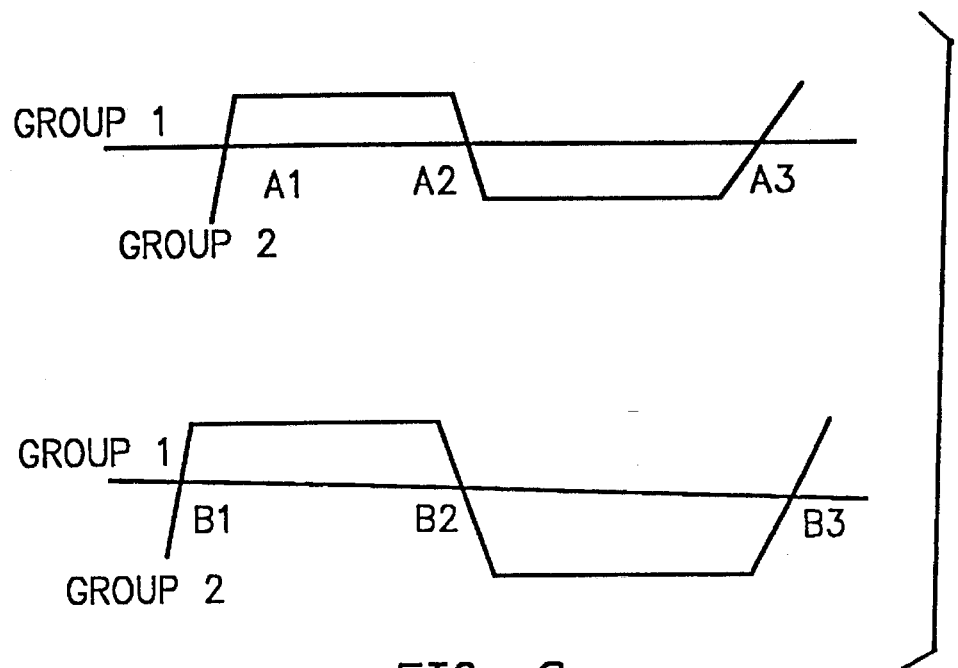
FIG. 9 illustrates the operation of the Limbo module according to the present invention.

Referring to FIG. 9, the Limbo module, for example, would accept A1-B1, A2-B2 and A3-B3, but would eliminate the following potential matches:

A1-B2, A1-B3, A2-B1, A2-B3, A3-B1, A3-B2

7.2 Proxy

This module rejects Track-file records when the distance between potentially matched 0-cells from maps A and B exceed a certain threshold and marks the rejected Track-file records with the symbol "D."

7.3 Fluff

Figure 10:
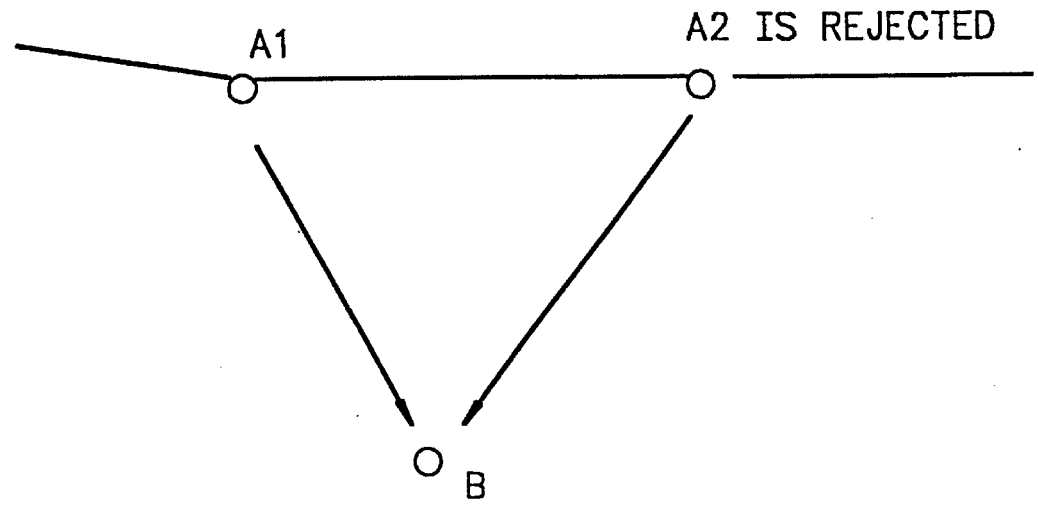
FIG. 10 illustrates the Fluff module according to the present invention.

Referring to FIG. 10, this module rejects all but one of multiple matches of 0-cells within a chain and labels the rejected records with a symbol "F."

7.4 Train

Figure 11:
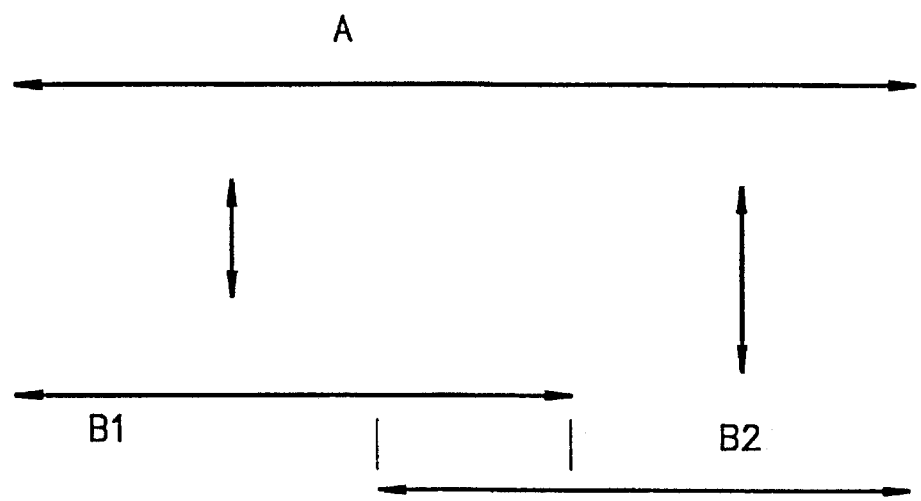
FIG. 11 illustrates the operation of the Train module according to the present invention.

If a part of a chain in map A is potentially matched to more than one other chain in map B, the module rejects all but the longest such chain and labels the rejected records with the symbol "T." For example, referring to FIG. 11, there is represented an A-chain and two B-chains, i.e. B1-chain and B2-chain, which partially overlap with each other and with part of the A-chain. The Train module rejects the overlapping part of the B2-chain. The reason for this is that no part of A-Chain should correspond to two streets in the B-map at the same time.

7.5 Ambi

The Ambi module rejects all but one of the multiple matches on the entire map and labels the rejected records with a symbol "A." After the Ambi module is run only unambiguous potential 0-cell matches remain.

7.6 Mono

Figure 12:
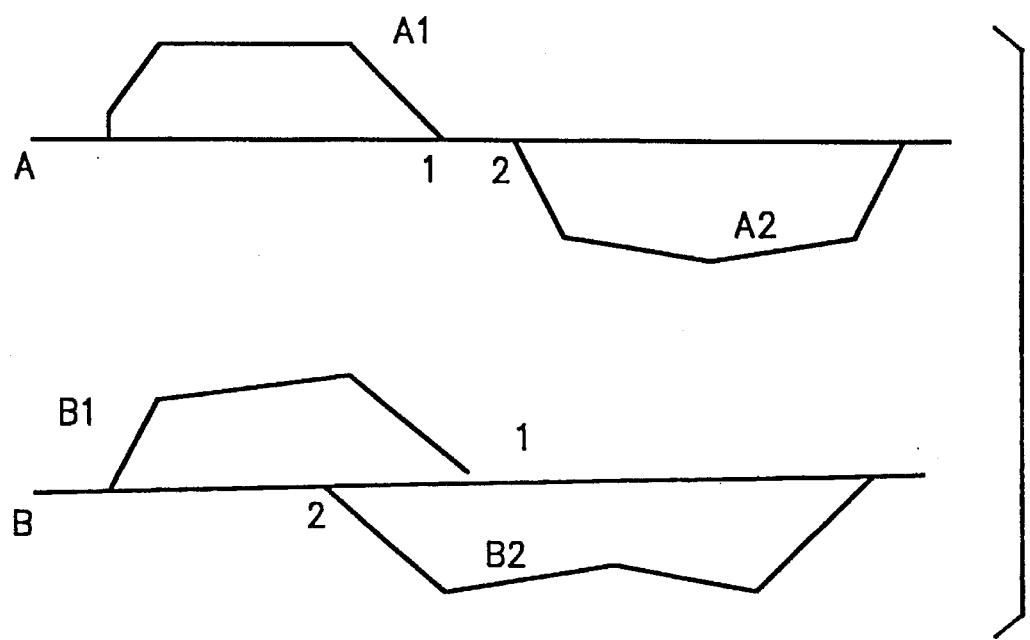
FIG. 12 illustrates the operation of the Mono module according to the present invention.

Referring to FIG. 12, the Mono module recognizes potential 0-cell matches with non-monotone indices and labels the records of them with the a symbol "M." As seen in FIG. 12, the points 1 and 2 are in a reverse order on map A and map B.

7.7 Mar

The Mar module rejects all potential matches which have been rejected by any of preceding modules and labels the affected records with a symbol "R."

7.8 Zombie

Figure 13:
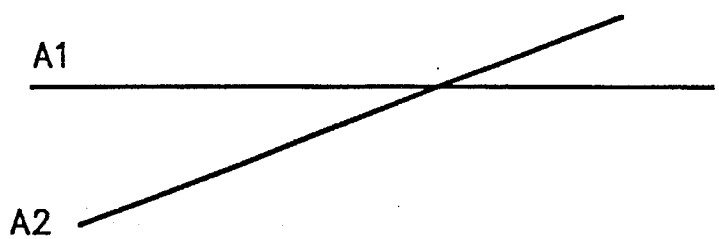
FIG. 13 illustrates the operation of the Zombie module according to the present invention.
Figure 13:
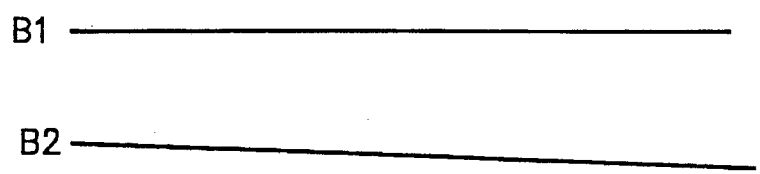

Referring to FIG. 13, the Zombie module recognizes and rejects all 0-cell matches at which chains on either map intersect in their internal parts and labels the affected records in the Track-file with the symbol "S." As can be seen, A1 and A2 intersect while B1 and B2 do not.

8.0 Whiskers matching

Figure 14:
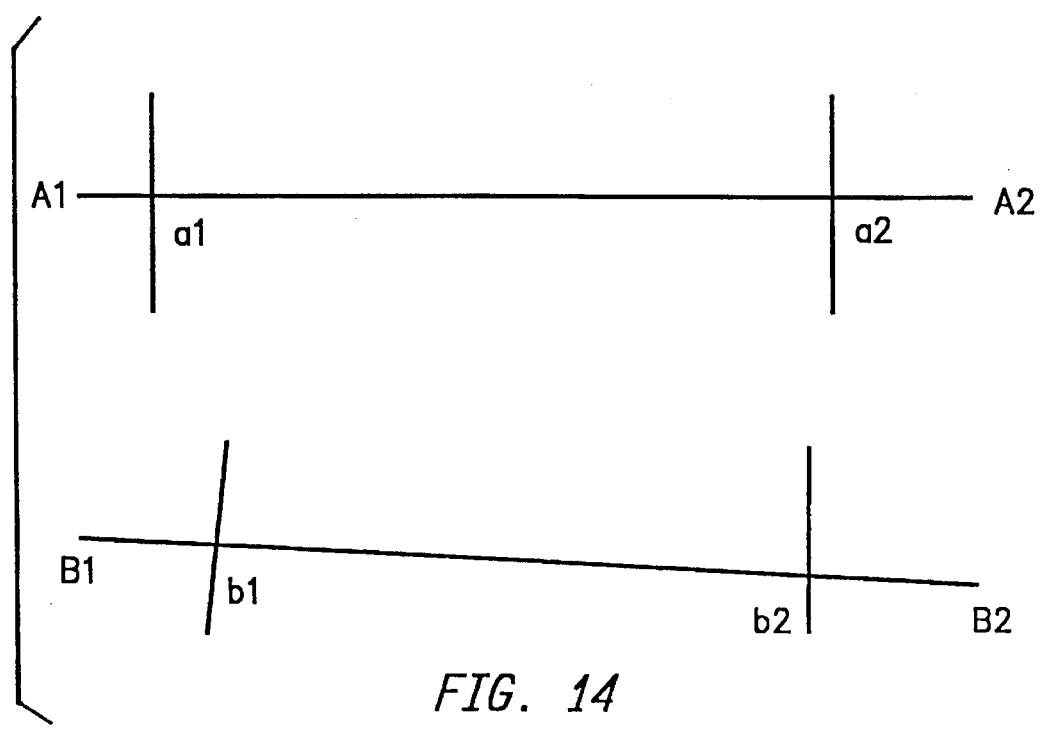
FIG. 14 illustrates operation of the Whiskers matching module according to the present invention.

Referring to FIG. 14, since many of a chain's endpoints may not be found in a Track-file, special processing is required. If a1 matches b1 and a2 matches b2 then the dangling parts (A1,a1)–(B1,b1) and (a2,A2)– (b2,B2) are tested for possible matching. A simple geometric verification is used as well as an ambiguity check. For example, if b2 has two tails there is ambiguity, i.e. no match.

8.1 Whip

The Whip module identifies the chains from A and B with a single potential match, checks if the match is identical with an actual match on another pair of chains and labels the records of all such potential matches with a symbol "X."

8.2 Stalk

The Stalk module is similar to the Whip module but covers the cases of double whiskers where a chain has the first and the last matched intersection, labels the record of the first matched intersection with a symbol "K" and the last matched intersection with a symbol "Q."

9.0 Creation of the factor-0-cells, factor-1-cell

Factor-1-cells are the parts of chains between two matched 0-cells.

9.1 Matrix

Figure 15:
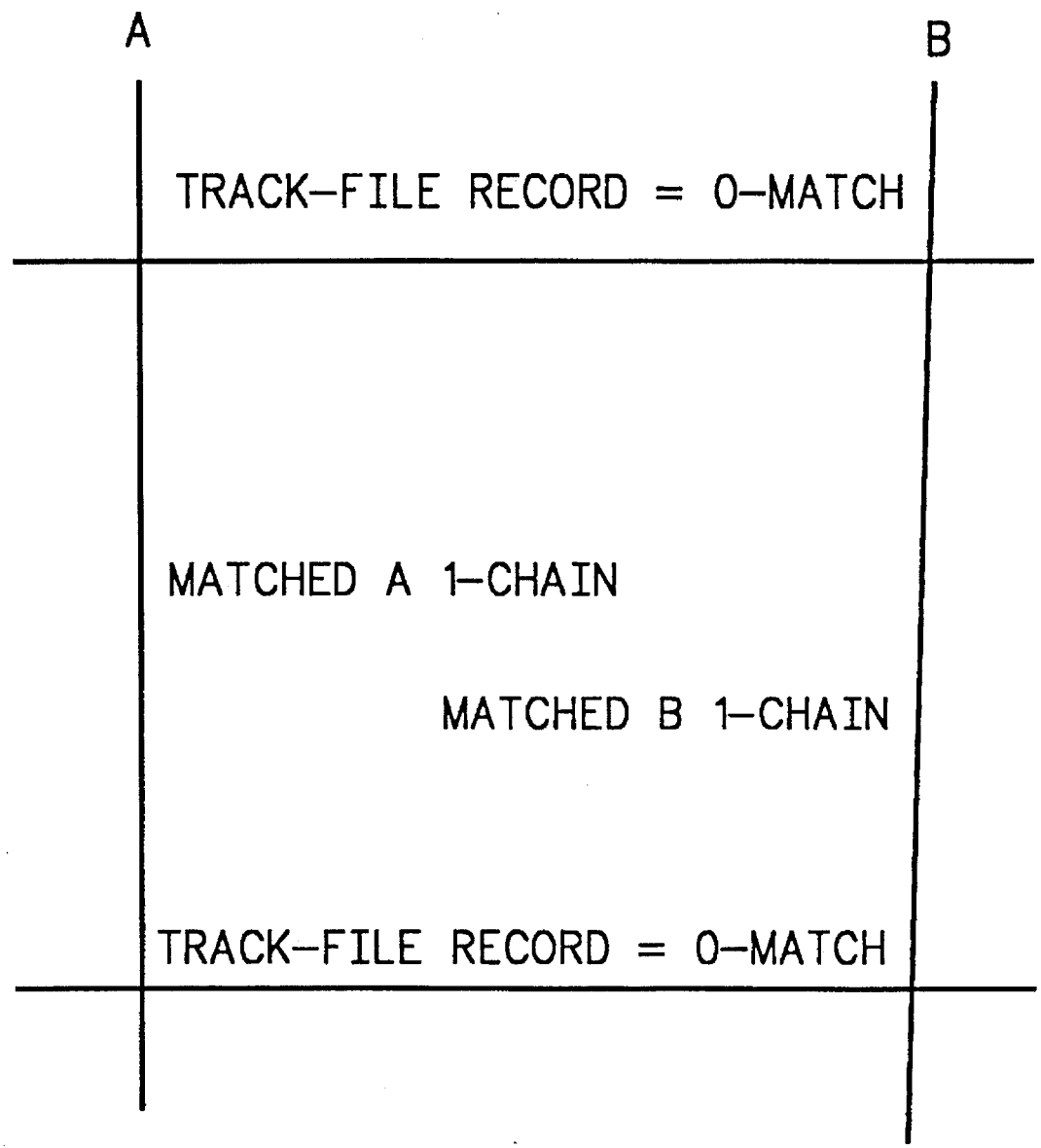
FIG. 15 illustrates the operation of the Matrix module according to the present invention.

Referring to FIG. 15, the Matrix module reads the Track-file and creates 0-dim (0-pair) and 1-dim (1-pair) (one for maps A and B) factor-graphs which are marked identically and stored in the corresponding files of the 0-cell and 1-cell matched chains.

9.2 Whisker

The Whisker module stops at the places spotted by the Whip module (see 8.1 above), performs additional topological and geometric verifications of the whiskers, i.e. chains with a single intersection end, and creates additional isomorphic chains out of them. If the verification fails, the corresponding record in the Track-file receives the label "Y."

9.3 Garden

The Garden module is the same as the Whisker module (see 9.2 above), but it uses Track-file labels made by the Stalk module (See 8.2 above). The records which successfully pass the test are marked with a "G." The others are marked by "Y."

10.0 One-two-one geometric cell matching

This step of cell matching selects potentially matchable single 1-cells, as distinguished from chains, from both files using only geometric properties of the cells, i.e. bounding boxes and distances.

10.1 Twinepre

The Twinepre module creates files of bounding boxes of the unmatched 1-cells from both the A and B maps.

10.2 Box

The box function normalizes box sizes by dividing them by a threshold and putting them in a box file.

10.3 Parabox

The Parabox module produces a list of potentially matching 1-cells by comparing the boxes read from the box-file and placing the resulting lists in a parabox-file.

10.4 Rope

The rope function computes distances between the potentially matching 1-cells and selects the one which gives the minimum.

10.5 Twine

The twine module picks up the selected pairs of the unmatched 1-cells and transforms them into trivial single-cell chains. A verification of the interference with the previously matched data is also provided.

11.0 Isomorphism verification

Two modules are responsible for the boundary loops verification of the chain-graph, the Vagabond module and the Tramp module.

11.1 Vagabond

Figure 16:
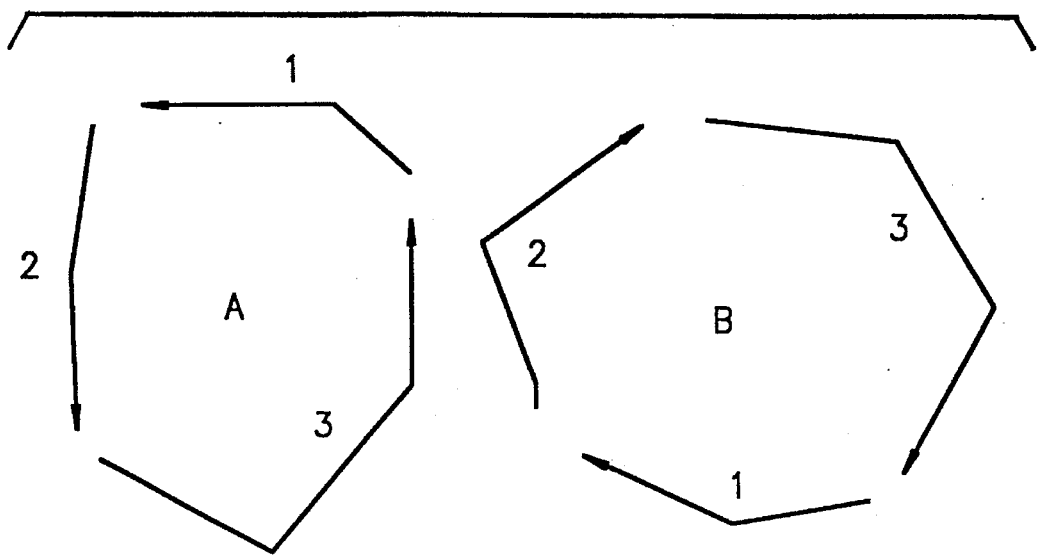
FIG. 16 illustrates the operation of the Vagabond module according to the present invention.

Referring to FIG. 16, the Vagabond module traverses matched chains, selects them one by one and begins walking in a certain direction. Once the module arrives at a matched 0-cell it chooses the next matched chain as the leftmost of the possible continuations. When the loop is closed then the orientation of the loops is checked. If the isomorphism is correct then the order of the visited chains from both maps A and B must be identical as well as their orientation. The chains violating the orientation identity are removed from the list of the matched chains.

11.2 Tramp

Figure 17:
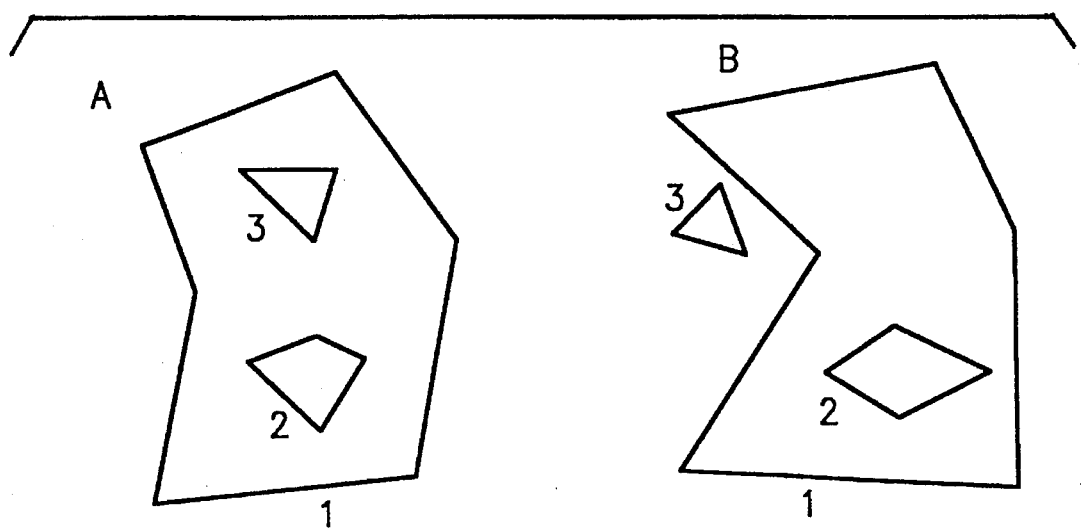
FIG. 17 illustrates the operation of the Tramp module according to the present invention.

Referring to FIG. 17, a loop of the matched chains may lay completely inside of another matched loop. If the isomorphism between factor-2-cells can be defined, then the isomorphic loops of factor-1-cells must contain inside themselves the sets of the other (or none) isomorphic loops. The Tramp module verifies this property and rejects the violators like loop 3.

12.0 Isomorphism on the factor-2-cell

12.1 Mkwards

Mkwards establishes an isomorphism which determines factor-2-cells and stores them in a so called ward file.

ATTRIBUTE CONFIGURATION

The following is a description of the attribute-rules configuration file for conflation according to the present invention.

Each line of this file gives a complete set of rules for a given class of attribute.

This file uses two keywords, CLASS and RULE, defined as follows:

CLASS:

This indicates the attribute class for which the conflation rule is being given on this line. CLASS must be the first keyword on the line but it may be preceded by a blank space.

RULE

This indicates the way to conflate an attribute on a given cell in map B in the case that the corresponding matched cell in map B has an attribute of the same class as the cell in map A.

The file also uses several "action" keywords:

take-B:

This action indicates that the user wishes to replace any map A attribute on this cell with the attribute found on the corresponding map B cell. NOTE: if no attribute of this class exists on the map B cell, NO action is taken (The map A attribute is NOT removed in this case).

make-conflict:

this action indicates that the user wishes to add the map B attribute to the given cell while leaving any map A attribute unchanged. At the same time the cell will be marked as having conflicting attribute, so that it can later be reviewed and resolved manually. Note that the cell will NOT be marked as a conflict if the attributes on both cells are in complete agreement. If there is ONLY a map B attribute (the corresponding map A cell has no attribute), this will act like "take-B". NOTE: if no attribute of this class exists on the map B cell, NO action is taken (the cell will NOT be marked as a conflict in this case).

append-B:

This action indicates that the user wishes to add the map B attribute to the existing map A attribute. In this case the cell is NOT marked as a conflict. If there is ONLY a map B attribute (the corresponding map A cell has no attribute), this will act like "take-B".

complement-A:

This action indicates that the user wishes to add the map B attribute if and only if the cell has no map A attribute of this class.

NOTES:

The default action is to keep the map A attribute. In the absence of an attribute conflation rule for a given class, the map B attribute of that class will be ignored, and the map A attribute will remain.

For any cell on which map B and map A have an identical attribute in a given class (except for attribute-level) the higher level will be taken if ANY attribute-conflation rule is specified.

An example of such attribute configuration files follows:

General Control Attributes

| CLASS:8 | RULE:complement-A | seam_control | 1 |
| CLASS:10 | RULE:complement-A | unmatched_B | 1 |

Network Feature

| CLASS:100 | RULE:complement-A | road_class | 1 |
| CLASS:102 | RULE:complement-A | bridge_name | 1 |
| CLASS:103 | RULE:complement-A | tunnel_name | 1 |

US Road Names [MapEngine Classes 120–129 + 140]

| CLASS:120 | RULE:complement-A | street_name | 1 |
| CLASS:120 | RULE:take-B | street_name | 1 |
| CLASS:121 | RULE:append-B | street_name_2 | 0 |
| CLASS:122 | RULE:append-B | interstate_1 | 0 |
| CLASS:124 | RULE:append-B | us_hwy_1 | 0 |
| CLASS:126 | RULE:append-B | state_hwy_1 | 0 |
| CLASS:128 | RULE:append-B | county_hwy | 0 |
| CLASS:129 | RULE:append-B | ftm_road | 1 |
| CLASS:140 | RULE:append-B | freeway_name | 0 |

US Address Ranges [MapEngine Classes 130–135]

| CLASS:130 | RULE:complement-A | from_left_addr | 1 |
| CLASS:131 | RULE:complement-A | to_left_addr | 1 |
| CLASS:132 | RULE:complement-A | from_right_addr | 1 |
| CLASS:133 | RULE:complement-A | to_right_addr | 1 |
| CLASS:134 | RULE:complement-A | addr_exception | 1 |
| CLASS:135 | RULE:complement-A | interp_addr | 1 |
| CLASS:660 | RULE:complement-A | addr_0c_marker | 0 |
| CLASS:661 | RULE:complement-A | addr_1c_marker | 0 |

US Geographic Codes [MapEngine Classes 200–299]

| CLASS:200 | RULE:make-conflict | state_abbr | 1 |
| CLASS:201 | RULE:make-conflict | county_code | 1 |
| CLASS:202 | RULE:take-B | mcd_code | 1 |
| CLASS:203 | RULE:take-B | city_code | 1 |
| CLASS:700 | RULE:take-B | census_tract | 1 |
| CLASS:701 | RULE:take-B | census_block | 1 |
| CLASS:800 | RULE:take-B | ua_code | 1 |
| CLASS:801 | RULE:take-B | urban_flag | 1 |

Water [MapEngine Classes 310–319]

| CLASS:310 | RULE:complement-A | water_class | 1 |
| CLASS:311 | RULE:append-B | water_name | 1 |

While preferred embodiments of the present invention are described above, it is contemplated that numerous modifications may be made thereto for particular applications without departing from the spirit and scope of the present invention. Accordingly, it is intended that the embodiments described be considered only as illustrative of the present invention and that the scope thereof should not be limited thereto but be determined by reference to the claims hereinafter provided.

What is claimed is:

1. A method of making a third digital map C from first and second digital maps A and B comprising the steps of:
   a. creating an initial version of map C by importing into map C all cells present in map A together with their attributes;
   b. matching chains of 1-cells in the map A and chains of 1-cells in the map B so as to create a corresponding pair of isomorphic factor-graphs;
   c. importing unmatched 0-cells belonging to matched chains of 1-cells from map B into map C;
   d. importing non-interfering unmatched 1-cells from map B into map C;
   e. importing attributes of matched 0-cells and 1-cells from map B into map C according to user supplied criteria;
   f. importing attributes into map C of said 1-cells from map B which were imported into map C in step d; and
   g. importing attributes for 2-cells according to said user supplied criteria.

2. A method according to claim 1 wherein said matching step b comprises the steps of:
   a. looking at all 1-cells on both maps A and B separately;
   b. starting with a first 1-cell, looping through a list of all suitable attributes of each of said 1-cells to find another 1-cell with a same value connected to a first end of said first 1-cell;

c. if such a 1-cell is found, extending the chain up to a point where there are no more identically attributed 1-cells or more than one 1-cell is found having the same attribute value;

d. repeating steps (b) and (c) with respect to the 0-cell at a second end of said first 1-cell;

e. labeling specifically each 1-cell added to said chain to prevent said added 1-cells from being processed twice; and f. generating a chain file of chain-records, each chain-record comprising a list of all the 1-cells added to said chain, each chain-record having a unique chain-record number and the following format:

<attribute value><A/B map><first point on the chain><last point on the chain>.

3. A method according to claim 2 further comprising the steps of:

a. labeling each chain-record in a chain-file with a group number; and b. if two chains have different attribute values which nevertheless may be considered to be identical, labeling each of the chain-records corresponding thereto with the same group number.

4. A method according to claim 3 further comprising the step of:

placing all 0-cells on created chains in two dot-files having the following format:

<cell identifier><group number><chain number><cell index>, where the <cell index> is a sequential index of a 0-cell in the chain.

5. A method according to claim 4 further comprising the step of:

if a b 0-cell in a dot-file belongs to two different chains, forming a record of a grid file having the following format:

<amended group2><A/B><chain1 chain2> . . . <index1 index 2><cell id>.

6. A method according to claim 5, further comprising the steps of:

a. if there are records in a grid file, one from map A and one from map B with the same pair of groups, forming a track-file by combining pairs of records of grid-files wherein records in the grid files of each of the maps has the following format:

<group1 group2><A><chainA1 chainA2> . . . <indexA1 indexA 2><cell A>

<group1 group2><B><chainB1 chainB2> . . . <indexB1 indexB 2><cell B>;

the two track-records corresponding to the same intersection have the following format:

<chainA1 chainB1><indexA1 index B1><cell A cell B>

<chainA2 chainB2><indexA2 index B2><cell A cell B>;

b. labeling those chains which belong to more than one group in order to prevent formation of numerous false potential matches; and c. sorting the resulting track-file lexicographically.

7. A method according to claim 1 wherein said matching step b comprises the step of:

building an isomorphism between two subsets of 0-cells by several successive runs of different filtering procedures which reject certain potential matches if they are recognized as invalid.

8. A method according to claim 7, comprising the steps of:

a. recognizing multiple intersections of a chain from map A and a chain from map B;

b. detecting a mutual orientation of potentially matchable chains; and c. rejecting potential 0-cell matches which do not agree with the orientation.

9. A method according to claim 7, comprising the step of:

rejecting track-file records when the distance between potentially matched 0-cells from maps A and B exceed a certain threshold.

10. A method according to claim 7, comprising the step of:

rejecting all but one of multiple matches of 0-cells within a chain.

11. A method according to claim 7, comprising the step of:

if a part of a chain in map A is potentially matched to more than one other chain in map B, rejecting all but the longest such chain.

12. A method according to claim 7, comprising the step of:

rejecting all but one of the multiple matches on maps A and B.

13. A method according to claim 7, comprising the step of:

recognizing potential 0-cell matches with non-monotone indices.

14. A method according to claim 7, comprising the step of:

rejecting all potential matches which have been rejected by any preceding modules.

15. A method according to claim 7, comprising the step of:

rejecting all 0-cell matches at which chains on either map A or B intersect in their internal parts.

16. A method according to claim 7, comprising the steps of:

in cases wherein endpoints of chains from maps A and B are not found in a track-file, testing the dangling parts of the chains for possible matching by a. means of a geometric verification; and b. an ambiguity check.

17. A method according to claim 7, comprising the steps of:

a. identifying chains from maps A and B with a single potential match; and b. determining if the match is identical with an actual match on another chain.

18. A method according to claim 7 comprising the steps of:

a. creating 0-dim and 1-dim factor-graphs for each of maps A and B;

b. marking the factor-graphs identically; and c. storing the factor-graphs in corresponding files of the matched chains.

19. A method according to claim 7 comprising the steps of:

selecting potentially matchable single 1-cells, as distinguished from chains, from both maps A and B using only geometric properties of the cells, i.e. bounding boxes and distances.

20. A method according to claim 7 comprising the steps of:

creating files of bounding boxes of the unmatched 1-cells from both the A and B maps.

21. A method according to claim 7 comprising the steps of:
   a. normalizing box sizes by dividing them by a threshold; and
   b. putting them in a box file.

22. A method according to claim 7 comprising the steps of:
   a. producing a list of potentially matching 1-cells by comparing boxes read from a box-file; and
   b. placing the resulting lists in a parabox-file.

23. A method according to claim 7 comprising the steps of:
   a. computing distances between potentially matching 1-cells; and
   b. selecting one distance which gives the minimum distance.

24. A method according to claim 7 comprising the step of: transforming selected pairs of the unmatched 1-cells into trivial single-cell chains.

25. A method according to claim 7 comprising the steps of:
   a. selecting the matched chains one by one;
   b. traversing each selected chain in a certain direction;
   c. once the traversing step arrives at a matched 0-cell, choosing the next matched chain as the leftmost of the possible continuations;
   d. when a loop is closed, checking that the order and orientation of the loops from both maps A and B are identical; and
   e. removing the chains which violate an order and orientation identity from a list of the matched chains.

26. A method according to claim 7 comprising the step of:
   a. if an isomorphism between factor-2-cells can be defined, verifying that the isomorphic loops of factor-1-cells contain inside themselves sets of the other (or none) isomorphic loops;
   b. rejecting the loops which do not meet the conditions of paragraph (a) above.

27. A method according to claim 7 comprising the step of:
   a. determining which factor-2-cells are isomorphic; and
   b. storing isomorphic factor-2-cells in a so-called file of wards.

28. A method according to claim 1 wherein said importing step d comprises the step of importing non-interfering unmatched 1-cells from map B into map C which, except for a predetermined portion of their respective ends, are, when the 1-cells are imported into map C, at least a predetermined distance from any adjacent 1-cell in the map C.

29. A method according to claim 28 wherein said importing step d comprises the step of utilizing a modified Bresenham algorithm for wide lines.

30. A method according to claim 29 wherein said step of utilizing a modified Bresenham algorithm for wide lines comprises the step of generating an array of square boxes which are superimposed in map C on the 1-cells imported from map A into map C, each of said boxes corresponding to a predetermined area.

31. A method according to claim 30 wherein said step of generating an array of square boxes which are superimposed in map C on the 1-cells imported from map A into map C, comprises the step of importing the array of boxes in map C into map B to identify the unmatched 1-cells in map B which will not interfere with the 1-cells from map A, each of said boxes corresponding to a predetermined area.

32. A method of making a third digital map C from a first digital map A and a second digital map B, maps A and B including 0-cells, 1-cells and 2-cells, the 0-cells, 1-cells and 2 cells having associated attributes, the method comprising the steps of:
   creating an initial version of map C by in, porting into map C 0-cells, 1-cells and 2-cells present in map A together with the associated attributes;
   creating chains of 1-cells of map A such that each chain includes 1-cells having a similar attribute;
   creating chains of 1-cells of map B such that each chain includes 1-cells having a similar attribute;
   matching said chains of 1-cells of map A with said chains of 1-cells of map B;
   importing non-interfering unmatched 1-cells from map B into map C;
   importing attributes of matched 1-cells and non-interfering unmatched 1-cells from map B into map C according to user supplied criteria; and
   importing attributes for 2-cells from map B to map C according to said user supplied criteria.

33. A method according to claim 32, further including the steps of:
   importing unmatched 0-cells belonging to matched chains of 1-cells from map B into map C; and
   importing attributes of said unmatched 0-cells belonging to matched chains from map B to map C.

34. A method according to claim 32, wherein the step of creating chains of 1-cells of map A comprises the steps of:
   starting with a first 1-cell of map A to create a first chain;
   adding to said first chain a second 1-cell that has suitable attributes and is connected to a first end of said first 1-cell via a 0-cell; and
   continuing to add additional 1-cells to said first chain until no more 1 cells remain with suitable attributes and connections, each of said added additional 1-cells having suitable attributes and being connected to an end of a 1-cell previously added to said first chain.

35. A method according to claim 32, wherein further including the step of:
   determining that an unmatched 1-cell is non-interfering by determining that said unmatched 1-cell, except for a predetermined portion of both ends of said unmatched 1-cell, is a predetermined distance from any adjacent 1-cell in map c.

36. A method according to claim 32 wherein said step of importing non-interfering unmatched 1-cells from map B into map C comprises the step of utilizing a modified Bresenham algorithm for wide lines.

37. A method according to claim 36 wherein said step of utilizing a modified Bresenham algorithm for wide lines comprises the step of generating an array of square boxes which are superimposed on map C on the 1-cells imported from map A into map C, each of said boxes corresponding to a predetermined area.

38. A method according to claim 37 wherein said step of generating an army of square boxes which are superimposed on map C on the 1-cells imported from map A into map C, comprises the step of importing the army of boxes in map C into map B to identify the unmatched 1-cells in map B which will not interfere with the 1-cells from map A, each of said boxes corresponding to a predetermined area.

39. A method of making a third digital map C from a first digital map A and a second digital map B, maps A and B including 0-cells, 1-cells and 2-cells, the cells having attributes, the method comprising the steps of:

creating an initial version of map C by importing into map C 0-cells, 1-cells and 2-cells present in map A together with the attributes;

creating chains of 1-cells of map A such that each chain includes 1-cells having a similar attribute;

creating chains of 1-cells of map B such that each chain includes 1-cells having a similar attribute;

matching said chains of 1-cells of map A with said chains of 1-cells of map B;

determining that an unmatched 1-cell is non-interfering by determining that said unmatched 1-cell, except for a predetermined portion of both ends of said unmatched 1-cell, is a predetermined distance from any adjacent 1-cell in map C;

importing non-interfering unmatched 1-cells from map B into map C;

importing unmatched 0-cells belonging to matched chains of 1-cells from map B into map C;

importing attributes of said unmatched 0-cells belonging to matched chains from map B to map C;

importing attributes of matched 1-cells and non-interfering unmatched 1-cells from map B into map C according to said user supplied criteria; and importing attributes for 2-cells from map B to map C according to said user supplied criteria.

40. A method according to claim 39, wherein the step of creating chains of 1-cells of map A comprises the steps of:

starting with a first 1-cell of map A to create a first chain;

adding to said first chain a second 1-cell that has suitable attributes and is connected to a first end of said first 1-cell via a 0-cell; and continuing to add additional 1-cells to said first chain until no more 1 cells remain with suitable attributes and connections, each of said added additional 1-cells having suitable attributes and being connected to an end of a 1-cell previously added to said first chain.

* * * * *

UNITED STATES PATENT AND TRADEMARK OFFICE
CERTIFICATE OF CORRECTION

PATENT NO. : 5,546,107
DATED : August 13, 1996
INVENTOR(S) : Deretsky, et al.

It is certified that error appears in the above-indentified patent and that said Letters Patent is hereby corrected as shown below:

Col. 15, line 38: after "if a" and before "0-cell" delete "b".

Col. 18, line 8: after "map C by" and before "into" delete "in, porting" and substitute therefor --importing--.

Col. 18, line 60: after "generating an" and before "of square" delete "army" and substitute therefor --array--.

Col. 18, line 62: after "importing the" and before "of boxes" delete "army" and substitute therefor --array--.

Signed and Sealed this

Twenty-seventh Day of May, 1997

Attest:

BRUCE LEHMAN

*Attesting Officer*    *Commissioner of Patents and Trademarks*